Figure 3:

Oct. 29, 1963  W. GRADA ETAL  3,109,154
APPARATUS FOR RECORDING RECEIVED ECHOES
Filed July 22, 1957  3 Sheets-Sheet 1
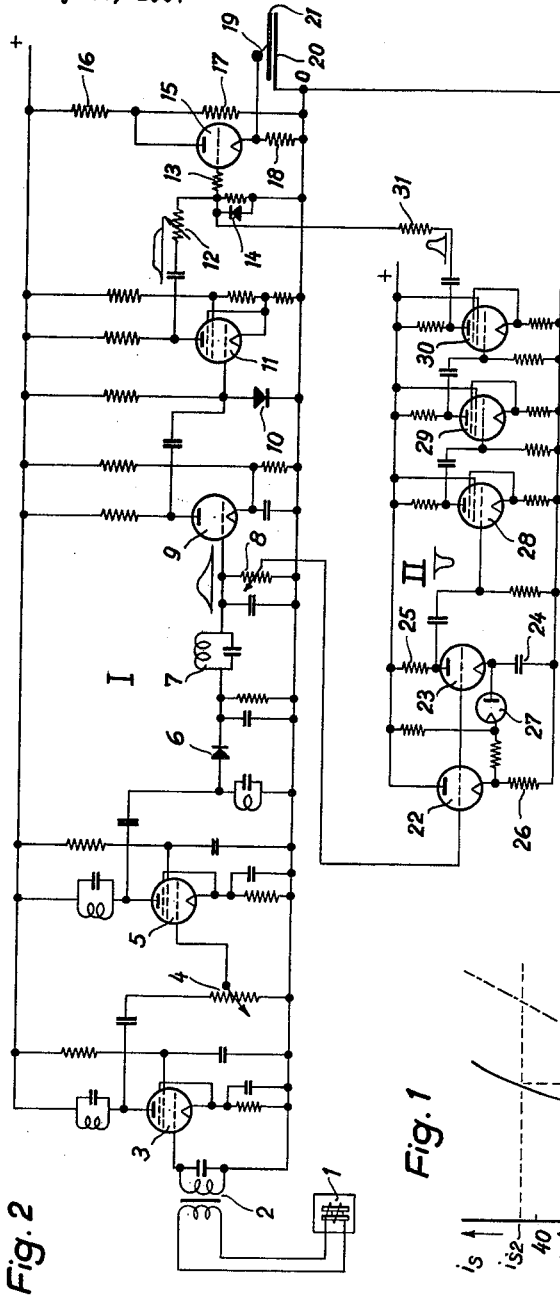
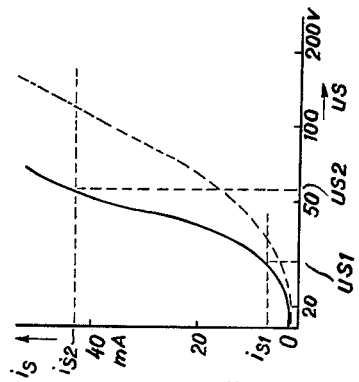
INVENTORS
Walter GRADA
Friedrich Wilhelm KALLMEYER
BY EZEKIEL WOLF
THEIR ATTORNEY INVENTORS
Walter GRADA
Friedrich Wilhelm KALLMEYER
BY Ezekiel Wolf
THEIR Attorney Oct. 29, 1963 W. GRADA ETAL 3,109,154
APPARATUS FOR RECORDING RECEIVED ECHOES
Filed July 22, 1957 3 Sheets-Sheet 3
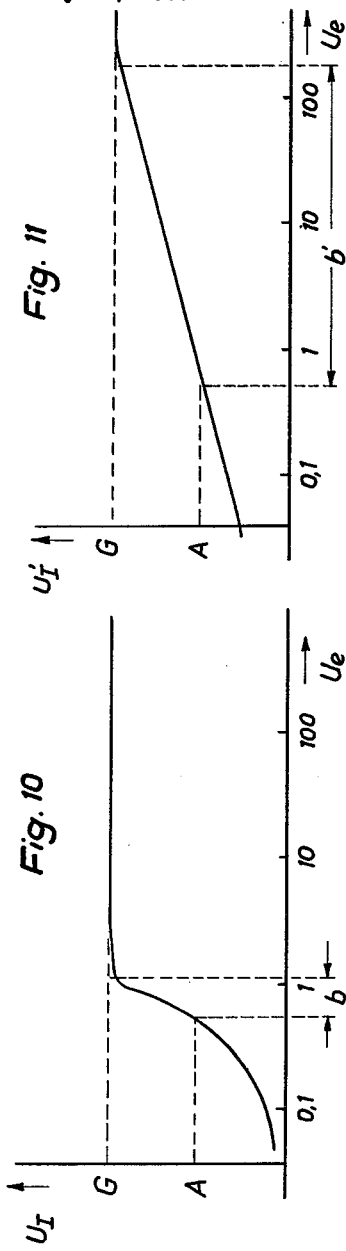
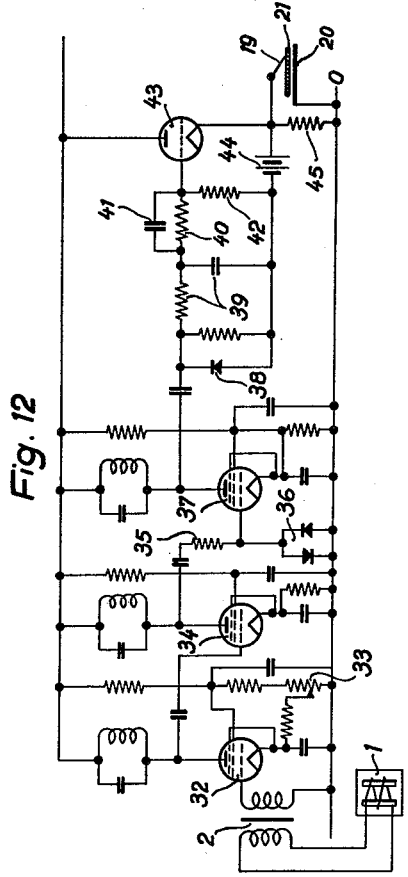
INVENTORS
Walter GRADA
Friedrich Wilhelm KALLMEYER
By Ezekiel Wolf
THEIR
ATTORNEY

United States Patent Office 3,109,154
Patented Oct. 29, 1963

3,109,154
APPARATUS FOR RECORDING
RECEIVED ECHOES
Walter Grada, 99 Hohentors-Heerstrasse, and Friedrich Wilhelm Kallmeyer, 38 Manteuffelstrasse, both of Bremen, Germany
Filed July 22, 1957, Ser. No. 673,457
Claims priority, application Germany July 28, 1956
15 Claims. (Cl. 340—3)

On ships, for the purpose of continuously recording sea depths beneath the ship as determined by the echo method, use is made of recording devices in which a stylus is periodically passed across a recording band to record the echo of a sound impulse emitted at the beginning of each passage of the stylus. The echo from the seabed is recorded in the form of a short line at a distance from the leading edge of the recording band corresponding to the time elapsing between the emission of the sound and the reception of the echo. The beginning of this line is used for reading off the depth against a scale disposed parallel to the path of the stylus. The recording band is slowly advanced in the longitudinal direction transversely to the path of the stylus, so that a curve of the sea depths over which the ship has passed, a so-called echogram, is obtained by joining up the echo recordings.

To record this curve, use is made of a current sensitive paper, for example a semi-moist paper impregnated with an electrolyte and a suitable indicator. A paper coated with a thin metallic coating burns at the point of entry of the current. A type of paper known under the trade name "Teledeltos," having a conductive body with a light-colored, insulating surface layer of predetermined chemical compounds which decompose and darken on the passage of current is suitable for making the recordings. The recordings are produced by the action of the amplified and, if desired, rectified received echo voltage fed to the stylus.

In addition to the echo from the sea bed, echoes from shoals of fish beneath the ship can also be recorded. Owing to the weakness of these echoes, it is necessary to amplify the received voltage to a greater degree than is the case when recording the bed echo. It is also possible to record echoes from stratum boundaries lying beneath the sea floor, for example, when the sea bed comprises sand or mud over a rock base.

From the intensity of the line drawn by the stylus on the reception of an echo, inferences regarding the amplitude of the echo impulse can be drawn only to a limited degree. This is because the range between received voltages producing a just visible recording and one of maximum contrast is relatively small, about 7 to 9 db in the case of Teledeltos paper for example, while the differences in amplitude of echoes to be recorded simultaneously, for example of a bed echo and a fish echo, may be 40 to 60 db. Since the echo received from an object does not have a constant strength, owing to the varying transmission conditions in the sea, the high degree of amplification required for recording weak echoes must be further increased by an additional amount to avoid periodic nonappearance of the recordings. Thus practically all interesting echoes, both strong and weak, are recorded with the same maximum possible thickness, which is in many respects undesirable. With the low directional sharpness of conventional echo sounding transmitters and receivers, echoes are received not only from the part of the sea floor lying vertically beneath the ship, but also from regions at the sides, so that the duration of the echo pulse reflected from the seabed is longer than the duration of the sound impulse emitted. The echoes received from a shoal of fish are also distributed over a greater depth range according to the lateral and depth extent of said shoal. In the case of a high degree of amplification, the bed echoes are recorded in their entire extent with the maximum intensity so that the depth curve appears as a wide black band. Apart from the unpleasant appearance, the intense evolution of fumes accompanying the recording of the wide band and rapid wear of the stylus are undesirable. A further disadvantage occurs in recording closely following echoes, as is the case for example in recording a shoal of fish near the sea bed or a boundary stratum lying just below the sea floor. Owing to the already described lengthening of the echo impulse, echoes of this kind overlap to a greater or lesser extent. Since they are both recorded in practically their entire extent with a constant intensity, they completely merge into one another in the recording and give the impression of a unitary echo. In the conventional recording process, shoals of fish are depicted by non-differentiated black patches, from which it is not possible to recognise the characteristic fluctuations of the course of the echo.

By using relay circuits responding when a threshold value is exceeded and known for echo sounding purposes, it would admittedly be possible to record only the beginning of the echoes, for example by discharging a condenser across the stylus. Then the evolution of fumes would be reduced to a minimum owing to the short length of recording of the echoes. However, this method does not appear suitable for recording overlapping echo impulses separately. A further objection to this method is that seamen are accustomed to draw certain conclusions regarding the nature of the seabed from the length of the bed echo. The invention therefore adopts a different way of improving the previous recording method.

To increase the slope of the front of received echo sounding impulses and to obtain a pulse beginning sharply defined as to time, it is known to differentiate the echo impulses after prior rectification. This process has been utilised especially in an electronic depth measuring device in which the received impulses control a sweep process.

According to the invention, the recording of received echoes on recording paper which is visibly variable on the passage of current is effected in such manner that the voltage derived from the received voltage by amplification in a manner know per se is limited in the recording circuit to a value which produces a recording of a contrast recognisably below the maximum possible contrast. This recording voltage has added to it a voltage derived by differentiation from the rectified received voltage in such a manner that when the received voltage rises, the contrast of the recording is increased beyond the value associated with the received voltage independently of time, the value associated with the limitation in particular also being exceeded.

According to this method, received echoes are recorded with the same sensitivity of response and in the same length as heretofore. However, since this recording is effected with a reduced intensity, any excessive evolution of fumes and rapid stylus wear are avoided. At the same time, the leading edge of a bed echo, for example, which is important for reading off the depth, is recorded with greater intensity, usually the maximum possible intensity in the case of a bed echo, and is readily recognizable, even if the echo returns from a relatively greater distance. A readily inspected echogram is obtained, of attractive and—especially when diverse echoes occur simultaneously—of relief-like appearance.

The duration of the rise at the beginning of an impulse is short in relation to the total impulse length and accordingly the length of the recording amplified by the derivation of the received voltage per unit of time is substantially less than the total impulse length. Moreover, since the derivative of an impulse reaches a maximum value earlier than the impulse itself, the rise of the recording voltage is steeper than with the usual type of recording and the time of reception of an impulse is more sharply defined.

The invention also includes the possibility of a non-linear amplification, especially amplitude compression, either or both before and/or after the differentiation. By means of compression, it is possible to introduce an additional gradation of the intensities with which the voltages are recorded, to correspond to the value thereof.

In order that the advantages of the invention may be better understood, the following should also be pointed out:

In using the echo sounding recorder for finding shoals of fish it is usual to set the reception amplification to the maximum value permitted by voyage and sea motion interference which is not to be recorded. This arises from the fact that the intensity of the fish echoes to be recorded is not known in advance and is frequently so small that they can easily be overlooked if the degree of amplification is too low. Even when fish recordings are present or are recognized as such, it is not possible to set the amplification so that the recording voltages associated with the received voltages lie in a favourable region of the contrast gradation curve of the recording paper; that is to say, the curve representing the dependency of the recording intensity on the voltage in the recording circuit. The reason for this is that on the one hand the fish echoes vary relatively rapidly and on the other hand the effect of a variation of the recording conditions becomes recognisable only from a plurality of recordings, thereby introducing a considerable delay. It is therefore a considerable advantage of the method according to the invention that said method is not dependent on a determined degree of amplification being set, but is still effective even when the amplification far exceeds the degree required for recording an echo.

The application of the method according to the invention will be described in greater detail hereinbelow with reference to the drawings, in which:

FIGURE 1 is a current/voltage curve for an electrically sensitive recording paper, FIGURE 2 is an amplifier arrangement for performing the method according to the invention, with separate transmission channels for the received voltage and its derivative, FIGURES 3 to 9 are curves showing the amplitude of a compound echo and the recordings obtained therefrom, FIGURES 10 and 11 are curves showing the transmission properties of a branch of the circuit according to FIGURE 2 in two different constructions, FIGURE 12 is a simplified amplifier arrangement for performing the method according to the invention, FIGURE 13 is another construction of a part of the circuit according to FIGURE 12.

FIGURE 1 shows the current/voltage characteristic of a recording paper (Teledeltos) usual for echo sounder recorders, as a solid curve.

The recording voltage (terminal voltage), which is plotted on a logarithmic scale, is denoted by $u_s$, the recording current by $i_s$. The blackening of the paper may be assumed to be approximately proportional to the recording current. Both the recording current and the blackening depend on the speed of the stylus. The curve shown applies for a mean recording speed of about 1 metre per second. The first visible recordings occur at a voltage $u_{s1}$.

At a voltage $u_{s2}$ approximately twice as great as $u_{s1}$, the maximum possible blackening is obtained, which does not increase further if the voltage rise continues. However, if the voltage continues to rise, the recording paper is damaged. The recording is accompanied by the evolution of fumes, this increasing as the recording current increases. The recording current, or the blackening corresponding thereto, may also be considered as dependent upon the driving voltage in the recording circuit or upon the control voltage at the grid of an electronic tube in the anode circuit of which the stylus is situated, in which case the internal resistance of the voltage source or the amplification factor must be taken into consideration. The broken curve in FIGURE 1 shows the changed characteristic due to a series resistance of 1000 ohms. The blackening depends on the recording current in the same way as in the case of the solid curve. By means of a larger series resistance in the recording circuit, the blackening range available can be distributed over a correspondingly greater voltage range, but the voltage increase entailed thereby is undesirable for operational reasons.

Apart from this, simply compressing the current/voltage characteristic does not give a gradation curve suitable for reproducing received voltages of a range extending over two to three decades with different degrees of blackening. A gradation curve of that kind can be obtained only by logarithmic compression of the received voltage.

For the following description of the exemplified embodiments, it is assumed that a light-colored recording paper is used, said paper turning black on the passage of current. The recording intensities are accordingly designated light grey to deep black. The invention can, however, be applied when use is made of any desired recording means which provide recordings distinguishable for different voltages or currents.

A reception amplifier arrangement suitable for performing the method according to the invention is shown in FIGURE 2. A transmitting means (not shown) produces sound impulses having an oscillation frequency of about 20 to 100 kc./s. and a duration of about 2 to 0.5 msec. The echo impulses returning from the water are received by an electroacoustic transducer 1 and are fed through an input transformer 2 as an input voltage of the amplitude $u_e(t)$ to the grid of an amplifier tube 3. To the latter is coupled a second amplifier tube 5 through a regulating potentiometer 4 having an exponential characteristic. The amplified received voltage is further fed to a rectifier 6 and through filter and smoothing means 7 to a resistance 8, likewise constructed as a potentiometer having an exponential characteristic, as a positive direct-voltage. This is amplified further, firstly by the tube 9, in the transmission channel I comprising the circuit elements 9 to 12, and is fed with the inverse sign to the grid of the tube 11 which amplifies negative voltages only up to a limit governed by the lower break in the anode current characteristic. Any charges on the grid feed line are immediately carried off by a rectifier 10 so that the grid always has the same initial potential, which is only slightly more negative than the cathode potential which is fixed by a voltage divider. The amplified, rectified and limited received voltage is fed through a decoupling resistance 12 and a buffer resistance 13 to the grid of an output tube 15, the anode voltage of which is taken from a voltage divider 16, 17. In parallel with the cathode resistance 18 of the tube 15 is in the stylus 19 with the counterelectrode 20, the recording strip 21 being disposed between these. The voltage occurring at the resistance 18 in the state of rest is below the response voltage of the recording paper. A rectifier 14 eliminates any charges on the grid feed line.

A part of the rectified voltage at the resistance 8 is taken off an adjustable tap and fed for differentiation purposes to a transmission channel II comprising the circuit elements 22 to 31. The tubes 22 and 23 are connected as cathode followers. On a rise of the voltage fed to the grid of the tube 23, the cathode voltage follows and the condenser 24 charges up with a current intensity proportional to the rate of the voltage rise. The voltage drop thus occurring at the resistance 25 is proportional to the differential quantity $u_e(t)$ of the rectified input voltage. A drop of the voltage at the grid of the tube 23 does not result in a corresponding discharge of the condenser 24, because the tube then cuts off. As a result, an auxiliary circuit is provided for the discharge of the condenser. The voltage at the cathode resistance 26 follows the voltage fed to the grids of the tubes 22, 23. As long as this voltage rises, the voltages at 24 and 26 increase to the same extent and the diode 27 is non-conducting. On a drop of the voltage at the grids, the voltage at the resistance 26 drops and the condenser voltage adapts itself to this voltage through the diode 27 without a current flowing in the anode resistance 25. A control voltage is therefore fed to the grid of the next amplifier tube 28 only when $u_e'(t)$ has positive values. Said control voltage is further amplified in the tubes 29, 30 and is fed through the decoupling resistance 31 as a positive impulse to the grid of the tube 15, which is thereby additionally modulated.

The amplification of the limiter tube 11 is so dimensioned that the control voltage obtained at the grid of the tube 15 for a received voltage limited in said limiter 11 modulates the output tube only to such an extent that a grey—not a black—recording is obtained. A suitable shade of grey can be set by varying the resistance 12. For a certain range of received voltages below the smallest value subjected to limiting, recordings are obtained in a lighter shade of grey, and still smaller received voltages no longer provide recordings because the voltage in the recording circuit remains below the response voltage of the paper. In the channel II, the amplification of the tubes 28, 29, 30 is so selected that at the smallest voltage at the resistance 8 still producing a recording through channel I and assuming a certain minimum steepness for the echo impulses, the control voltage at the grid of the tube 15 derived by differentiation from the received voltage has approximately the value of the control voltage derived independently of time from the received voltage. By adjusting the tapping of the potentiometer 8 the voltage fed to channel II can be so set that the additional voltage delivered by channel II perceptibly intensifies the recordings obtained with channel I. Once the potentiometer 8 has been set when the apparatus is put into operation, the setting need no longer be varied, even on operation of the sensitivity regulator 4, since it may be expected that the quotient $$\frac{u'_e(t)}{u_e(t)}$$

will have substantially the same value for all echo impulses. By means of the potentiometer 4 the sensitivity is adjusted; that is, the value of the smallest received voltage still recorded is selected, the selection as a rule being determined by the noise level occurring. In the case of received voltages considerably exceeding the recording limit, the output voltage of channel II will be much greater than that of channel I and produce completely black recordings. In order to prevent damage to the paper when recording intense impulses, the extent to which the tube 15 can be modulated is so reduced by reduction of the anode voltage that the voltage in the recording circuit does not exceed the value sufficient for the production of black recordings. Instead of this system, it would also be possible to provide limiting of the control voltage delivered by channel II.

If C denotes the capacity of the condenser 24, R the value of the resistance 25, $r_p$ the anode resistance of the tube 23 and $\mu$ its amplification factor, then the effective time constant of the circuit illustrated is given by $$\frac{(R+r_p)C}{\mu+1}$$

This value is made small in relation to the time of rise of the echo impulses, in order that the differentiation may be as free from error as possible.

Figure 4:
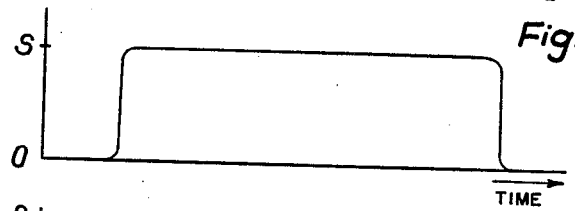
Figure 5:
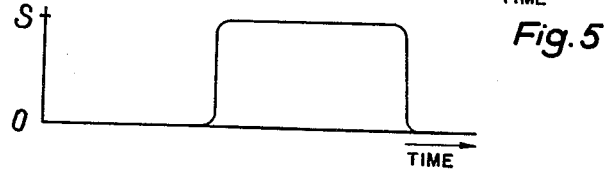
Figure 6:
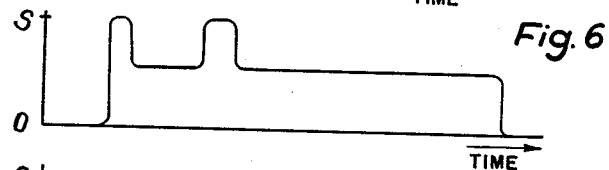
Figure 7:
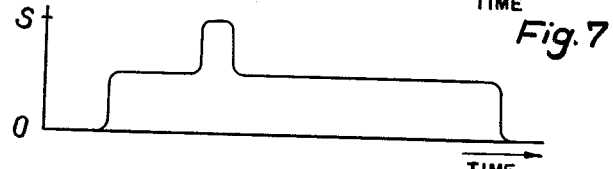
Figure 8:
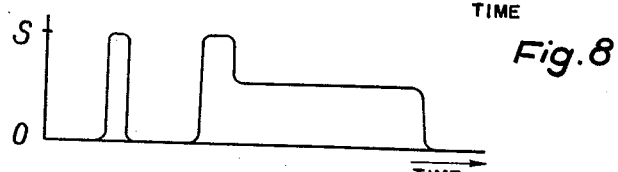

The mode of operation of the circuit according to FIGURE 2 in comparison with a conventional echo sounder amplifier is explained with reference to the FIGURES 3 to 8. A pulse shape as illustrated in FIGURE 3 is taken as a basis for this. The curve corresponds to the amplitude curve of the oscillation impulse or the shape of the impulse after rectification. A pulse shape of this kind composed of various echoes is obtained for example when a shoal of fish is located just above the sea bed or when a loose stratum of mud rests on a rock base. One would think that it would be possible with a conventional echo sounder amplifier to adjust the amplification of the received voltage so that the first part of the echo is recorded as grey and the second black. Experience shows however that this is not possible. The reason for this is that on the one hand the voltage range in which a recording with different intensities is possible is relatively small and on the other hand the intensity of the received echoes varies. If the amplification is made so great that even weak echoes are recorded, the compound impulse of FIGURE 3 is recorded in its entirety as black, as shown in FIGURE 4. In this and the following figures the blackening values are plotted as coordinates with the minimum value zero and the maximum value S. As an index of the blackening, use can be made of a grey scale based on equal perception differences. Since in the present case the first and the second part of the impulse have a noteworthy amplitude difference, it may be possible, with careful reduction of the amplification, to record only the second part (FIGURE 5). In this case too, the recording is uniformly black over the greater part of its length. In normal usage of the echo sounder recorder, analysis of received echoes by stagewise variation of the amplification cannot be carried out. With the amplifier arrangement according to FIGURE 2 the impulse according to FIGURE 3 is reproduced by the recording shown in FIGURE 6. The regulator 4 is set so that there is still an excess of amplification, even for the small amplitudes. Both the first and the second rise of the impulse are indicated by short black recordings, while a grey recording distinguishes the total length of the impulse. Recordings as shown in FIGURE 7 or FIGURE 8 can be obtained with smaller amplification or with a slightly altered impulse shape. In these recordings too, the front of the stronger echo is clearly recognizable and such that it is preceded by another. Recordings such as the last two can also be produced arbitrarily by adjusting the tapping of the potentiometer 8.

FIGURE 10 shows the dependency of the output voltage $u_1$ of channel I on the received voltage $u_e$, as arises on limitation of the received voltage by the tube 11. A logarithmic scale is chosen for the received voltage measured in an arbitrary unit. The first rising part of the curve corresponds to a linear dependence of the two voltages. An adjustment of the sensitivity regulator 4 would produce a parallel displacement of the curve in the direction of the x-axis. The ordinate value G occurs on limitation and furnishes a grey recording. The recording begins at the ordinate value A. The region $b$ of the received voltage, in which said voltage is capable of producing recordings of different intensities, is relatively small and hardly occurs in practice. In order to make the recordings obtained in an amplifier arrangement of the type illustrated in FIGURE 2, for example, more informative, the received voltage region reproduced in various shades of grey may be increased by logarithmation of the impulse voltage in channel I, whether before or after the limiting. For this purpose the voltage is fed to a series circuit of a large resistance and a suitable rectifier contact, from which latter the logarithmated voltage is taken off. Dependency of the output voltage of channel I on the received voltage is thus obtained in accordance with FIGURE 11. The region $b'$ of different blackening is considerably increased in comparison to the corresponding region $b$ in FIGURE 10. Both curves are drawn for the same response sensitivity, which is given by the received voltage associated with the ordinate A. The extent of the region $b'$ will be defined by limits in the ratio of about 1:100 to 1:1000. A larger region has the disadvantage of less dependency of the blackening on the amplitude but on the other hand makes less requirements of the adjustment of a determined sensitivity. In practical use it is advisable first to use a large excess of amplification, in order to record weak echoes as well, and thereupon to reduce the amplification in order to record interesting echoes with gradation. The action of channel II is not influenced by the described modification of channel I.

Figure 9:
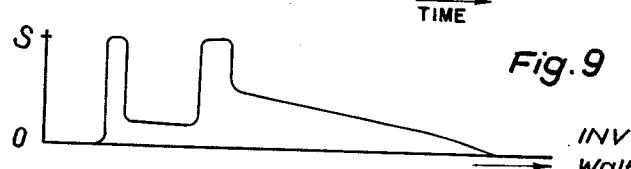

FIGURE 9 shows the blackening distribution, obtainable with the modified arrangement, for the echo impulse assumed as an example and shown in FIGURE 3. Logarithmation may also be carried out in channel II in order to reproduce different slopes of the impulses by differences in blackening. If the logarithmation is carried out before the differentiation, the result is a steepening of the front of the impulse voltage obtained at the output of the channel.

In conjunction with the method according to the invention, use may also be made of another recording method proposed for producing two different recording intensities for received voltages lying below and above a selective voltage limit, in which method the received voltage is fed through two transmission channels which are connected in parallel on the input and output sides and one of which has a high amplification and low limiting of the output voltage and the other a lower amplification and greater limiting. Channel I could for example be split up into two channels so that the received voltages are recorded in two different shades of grey according to their magnitude.

Instead of using a C–R circuit, differentiation of the impulse voltage may also be effected by feeding the impulse through a delay line and deducting the thus obtained voltage corresponding to a time earlier by fractions of a millisecond, from the non-delayed voltage.

Suppression of the negative half wave of the differentiated impulse voltage by rectification may be dispensed with in some circumstances. Brightening of the amplitude recording does then occur, it is true, for the trailing edge of an impulse. However, since the rear flank of the echo impulses usually has less steepness than the front, the amplitude recording is not completely suppressed as a result.

For test purposes, a switch may be provided whereby channels I and II can also be operated separately.

A simplified amplifier construction, which is also suitable for performing the method according to the invention, is shown in FIGURE 12. Since the received voltage is logarithmically compressed and then differentiated, it is possible to use only one transmission channel. The echo received voltage is fed to the control grid of a first amplifier tube 32 having an exponential characteristic, the amplification of which is regulated by a variable resistance 33 disposed in the cathode line. The impulse voltage, again amplified in a second tube 34 is fed for logarithmation purposes to a series circuit comprising a resistance 35 and two crystals rectifiers 36. The latter lie in the input circuit of an amplifier tube 37, which acts as a limiter when the supplied input alternating voltage has sufficient amplitude, so that the amplitude of the output voltage of the tube 37 does not exceed a top limit value. The output voltage is rectified by a rectifier 38 and the rectified voltage, after passing through a filter circuit 39, is fed to a voltage divider comprising a resistance 40 and a condenser 41 connected in parallel with a resistance 42 in series. The voltage tapped off at the resistance 42 is applied to the control grid of an output tube 43, which is negatively biased by a voltage source 44. The recording circuit with the elements 19, 20, 21 is in parallel with the cathode resistance 45.

The voltage divider with the elements 40, 41, 42 may be regarded as a combination of a normal resistance voltage divider 40, 42 with a C–R differentiator 41, 42. The former delivers a control voltage which produces a recording of the received amplitude independently of its variations per unit of time while the latter furnishes an additional control voltage which responds to a rising received voltage, by amplifying the recording which is directly amplitude-dependent. Limiting by the tube 37 and the division ratio of the voltage divider 40, 42 are so adapted to one another that the recording of the undifferentiated received voltage is never effected with full intensity; that is to say, it is received only in shades of grey. The dependency of the control voltage occurring under these circumstances at the grid of the tube 43, upon the received voltage corresponds to that illustrated in FIGURE 11. By controlling the received signal gain with the regulator 33, the region $b'$ can be shifted to lower or higher received voltages. Each rise of the received voltage falling only partially into the region $b'$ as well produces an additional control voltage across the condenser 41, which control voltage produces a blacker if not, as in the case of all the larger echo impulses, a completely black recording. The electrical values for the elements 40, 41, 42 of the voltage divider, which in the present case are 4 megohms, 1000 pf., 0.3 megohm, are so selected, taking into account the value to be expected for the quotient:

$$\frac{u'_e(t)}{u_e(t)}$$

that the additional voltage produced by the front of the echo impulses occurring is always sufficient to intensify the recording of an impulse in a clearly recognisable manner when said impulse has an amplitude sufficient for recording without differentiation. Variations of the amplitude of an impulse per unit of time which lie solely in the region in which limitation of the received amplitude operates cannot produce an additional control voltage. In order therefore to obtain the intensified recording of echo fronts for the maximum possible range of echo strengths and to be as independent as possible of the setting of a determined amplification for the received signals, the region $b'$ should be as large as possible, at least 1:100. When the method according to the invention is to be used only in recording a single bed echo, for example in a survey sounding where the advantage of the better defined edge for reading off the recording is particularly important, the $b$ region in an amplifier according to FIGURE 12 may also be smaller than indicated and in some circumstances logarithmation of the received voltage be completely dispensed with. With the large amplitude of the bed echo, the adjustment of the correct reception amplification for the recording with a black leading edge causes no difficulties. The negative additional control voltage produced on decreasing echo amplitude is not suppressed with the circuit according to FIGURE 12. As already stated hereinabove, this is usually permissible. The resistance 40 and the condenser 41 may be adapted to be put out of operation individually, whereby there is a choice of three different types of recording.

The limiting and/or logarithmation of the received voltage may also be effected after rectification.

FIGURE 13 shows a modification of the circuit of the differentiating voltage divider of FIGURE 12, wherein the occurrence of a negative additional control voltage at the grid of the tube 43 on decreasing control voltage is avoided. In parallel with the voltage divider formed from the resistances 40, 42 is a second voltage divider with the resistances 46, 47 and the same voltage division ratio. In increasing input voltage the charging current of the condenser 41 flows through the rectifier 48 and the resistance 42, in which it produces an additional control voltage. On decreasing input voltage the condenser discharges through the rectifier 49 and the resistances 46, 47.

To reduce expenditure, the method according to the invention can also be applied by providing an amplifier which is adapted to be switched over and the operation of which in its two states of switching corresponds to the two channels in the circuit according to FIGURE 2, and which thus furnishes alternately a recording voltage derived directly from the received voltage and limited for recording in a grey shade, and a recording voltage derived from the received voltage by differentiation and subjected to no limitation of the recording intensity. Switching over of the amplifier is effected in time with the sound transmissions.

The output voltages of the two channels of FIGURE 2 may also be combined in some other way than intensifying one another purely additively, for example by using a mixer tube or another tube having two control grids of similar electronic switching means or modulation means.

When only the boundary between a bed echo and a directly preceding fish echo merging therewith in the recording has to be made plain, the method according to the invention may be modified in such manner for example that in the circuit according to FIGURE 2 the output voltage of channel II is added with inverse sign to the output voltage of channel I, whereby on the occurrence of an echo front the recording is suppressed or greatly attenuated. The recordings of the fish echo and the bed echo are then separated by a white line.

To secure a determined dependency of the recording currents deciding the recording intensity upon the control voltage fed to the grid of the output tube 15 or 43, a current feedback may be provided for these tubes. This feedback may include non-linear elements in order to obtain a suitable gradation curve. The blackening would then be measured against a grey scale built up on equal perception differences.

The method according to the invention can also be used to advantage in horizontal sounding.

We claim:

1. Apparatus for recording echo signals on recording paper adapted to change visibly upon the passage of a current due to an applied voltage, values of said applied voltage varying over a range specific to said paper producing varying degrees of contrast graded from zero recorded intensity to maximum recorded intensity of said recording paper, comprising means for receiving said echo signals and deriving a voltage therefrom, a first channel including means for amplifying said voltage, voltage limiting means connected to said amplifying means to limit said voltage to a predetermined level and cause said first channel when limiting said voltage to provide a first component of said applied voltage sufficient to produce a recorded intensity greater than said zero and less than said maximum intensity, a second channel including circuit means for differentiating said derived voltage, to provide a second component of said applied voltage, means for algebraically combining said first and second components to provide said applied voltage, a recorder, and means for coupling said applied voltage to said recorder, said predetermined level being such as to limit the recorded intensity caused by the output of the first channel to below said maximum recorded intensity.

2. The apparatus of claim 1 and further comprising, means having a logarithmic transfer characteristic for coupling signals to said first channel limiting means to compress the amplitude range of signals applied to the latter means.

3. The apparatus of claim 1 and further comprising, means having a logarithmic transfer characteristic for coupling signals to said second channel differentiating circuit to compress the amplitude range of the signals applied to the latter circuit.

4. Apparatus for recording echoes on recording paper adapted to exhibit a visible change upon the passage of a current, increasing current intensities producing corresponding degrees of contrast up to maximum recordable intensity of said paper, including means for deriving a signal from said echo, a first channel comprising means for amplifying said derived signal, amplitude limiting means connected to said amplifying means for causing said first channel when limiting the derived signal being amplified to provide a first signal component producing a first component of said current sufficient to produce a visible change on recording paper that is less than the current required to produce maximum recordable intensity of said paper, a second channel comprising means for differentiating said derived signal to provide a second signal component producing a second component of said current, means for algebraically combining said first and second signal components to provide a combined signal producing said current, means for applying the combined output signal so obtained to said recording paper to pass said current therethrough, said amplitude limiting means limiting the signal in said first channel to a value corresponding to a current intensity below that producing said maximum recordable intensity.

5. The apparatus of claim 4 and further comprising means for adding said second channel signal with a sign such as to increase the combined output signal upon an increase in the amplitude of said derived signal.

6. The apparatus of claim 5 and further comprising means for logarithmically compressing the desired signal amplitude range.

7. Apparatus for recording ultrasonic pulses reflected from objects in the sea on electro-sensitive paper comprising, means for receiving reflected pulses, including amplifier and gain control means, limiter means connected to the output of said receiving means for limiting maximum amplitude of received pulses to a predetermined level, adjustable attenuator means, electrical waveform differentiating means also connected to said receiving means through said adjustable attenuator means, a recorder, means for algebraically combining the modified pulses obtained at the outputs of both said limiter and differentiating means and applying the combined pulses each having an amplitude related to the amplitude level provided by said limiter means added to the amplitude level provided by said differentiating means, to said recorder adapted for producing linear markings on electro-sensitive paper, said predetermined level being such that that portion of the output of the combining means due to said limiter means output alone intensifies said paper definitely below the maximum attainable intensity level of the electro-sensitive paper while the output of the combining means due to said differentiating means output added to said first-mentioned portion coacts therewith to intensify said paper closer to said maximum attainable intensity level than said first-mentioned portion alone.

8. Apparatus according to claim 7, wherein said combining means combines both said outputs with such polarity that the leading edges of said modified pulses add.

9. Apparatus according to claim 8 and further comprising, additional circuit means associated with the differentiating means adapted to suppress those portions of the differentiated pulse waveforms corresponding to the trailing edges of the received pulses.

10. Apparatus for detecting objects in the sea by reflected ultrasonic pulses and indicating their presence and nature by recording pulses reflected from them on electro-sensitive paper, the improvement which comprises, a recorder, means for receiving the reflected pulses, means for limiting the amplitude of received pulses to a predetermined maximum level, means for applying them to a network having input and output terminals and adapted both for proportional transfer and quasi-differentiation of applied pulses, said network comprising a parallel resistor-capacitor combination, a second resistor connected in series with said parallel combination and the input terminals, the output terminals being in parallel to said second resistor, means for applying the output of said network including signal components proportional to pulses applied to said input and proportional to the time derivative of said pulses to said recorder adapted for producing on electro-sensitive paper markings, the intensity of said markings corresponding to applied signal amplitude, said predetermined level being such that that portion of the output of the network which results from proportional transfer causes markings whose intensity is definitely below the maximum attainable intensity for markings on the electro-sensitive paper.

11. In an echo sounding system for recording received echo signals reflected from distant surfaces upon a recording surface intensified in proportion to a recording signal, apparatus comprising, means responsive to said echo signals for providing electrical impulses of corresponding amplitude and duration, means responsive to said impulses for providing a first component of said recording signal for each of said impulses, means for establishing the amplitude of said first component sufficient to visibly mark said recording surface, differentiating means responsive to the leading edges of said impulses for providing a second component of said recording signal for each of said impulses, means for establishing said second component duration shorter than a substantially contemporaneous first component duration, and means for combining said first and second components to provide a recording impulse for each of said electrical impulses comprising said recording signal.

12. Apparatus in accordance with claim 11 in which said combining means cumulatively combines said first and second components.

13. In an echo sounding system for recording received echo signals reflected from distant surfaces upon a recording surface intensified in proportion to a recording signal, apparatus comprising, means responsive to said echo signals for providing electrical impulses of corresponding amplitude and duration, means responsive to those of said impulses which exceed a predetermined amplitude for providing a first component of said recording signal for each of said impulses, means for establishing the amplitude of said first component sufficient to mark said recording surface but less than that required to maximally intensify said surface, means responsive to the leading edges of said impulses for providing a second component of said recording signal for each of said impulses substantially coincident with said leading edge, means for establishing said second component duration shorter than the substantially contemporaneous first component duration, and means for combining said first and second components to provide a recording impulse for each of said electrical impulses comprising said recording signal.

14. Apparatus in accordance with claim 13 wherein said combining means cumulatively combines said first and second components.

15. In an echo sounding system for recording received echo signals reflected from distant surfaces upon a recording surface intensified in proportion to a recording signal, apparatus comprising, means responsive to said echo signals for providing electrical impulses of corresponding amplitude and duration, means responsive to those of said impulses which exceed a predetermined amplitude for providing a first component of said recording signal for each of said impulses, means for establishing the amplitude of said first component sufficient to visibly mark said recording surface but less than that required to maximally intensify said surface, means responsive to the leading edges of said impulses for providing a second component of said recording signal, means for establishing the sum of said first and second components sufficient to maximally intensify said recording surface in response to impulses which exceed a second predetermined amplitude greater than said first predetermined amplitude, and means for establishing the duration of said second component shorter than the duration of a substantially contemporaneous first component.

References Cited in the file of this patent

UNITED STATES PATENTS

| | | |
|---|---|---|
| 2,099,536 | Scherbatskoy et al. | Nov. 16, 1937 |
| 2,161,764 | Minton | June 6, 1939 |
| 2,500,746 | Ellenberger | Mar. 14, 1950 |
| 2,554,905 | Hawgins et al. | May 29, 1951 |
| 2,651,963 | Bischoff | Sept. 15, 1953 |
| 2,754,169 | Richardson | July 10, 1956 |
| 2,759,783 | Ross | Aug. 21, 1956 |

FOREIGN PATENTS

| | | |
|---|---|---|
| 745,643 | Great Britain | Feb. 29, 1956 |
| 758,881 | Great Britain | Oct. 10, 1956 |